Sept. 7, 1926.　　　　F. HELFENSTEIN, SR　　　　1,599,050
CHAIN CONNECTER
Filed April 24, 1926
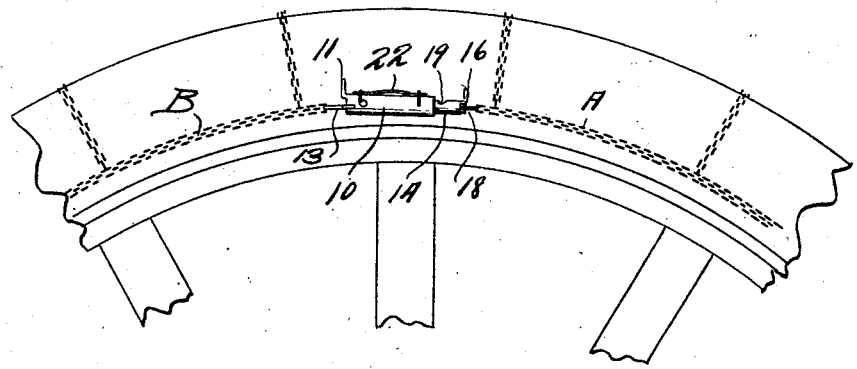
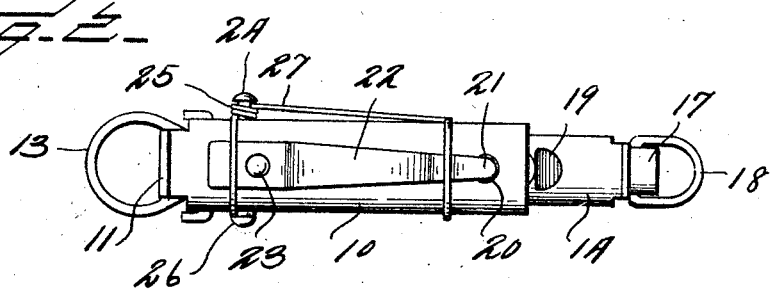
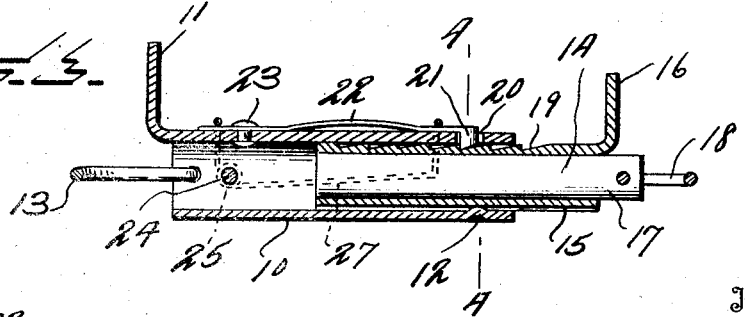
Inventor
Frederick Helfenstein, S.
By Watson E. Coleman
　　　　Attorney Patented Sept. 7, 1926.

1,599,050

UNITED STATES PATENT OFFICE.

FREDERICK HELFENSTEIN, SR., OF BISMARCK, NORTH DAKOTA, ASSIGNOR OF ONE-THIRD TO SAM SLOVEN, OF BISMARCK, NORTH DAKOTA.

CHAIN CONNECTER.

Application filed April 24, 1926. Serial No. 104,421.

This invention relates to devices for connecting chains and particularly to a device designed for use in connecting the ends of a tire chain.

The general object of the invention is to provide a device of this character whereby a chain of any character may be tightened up after it is placed in applied position, and provide means whereby the chain may be held in its tightened condition but released when desired.

A further object is to provide a device of this character which is very simple, may be cheaply made, which is positive in its action and which may permit slack to be taken up from time to time.

My invention is illustrated in the accompanying drawings wherein:—

Figure 1 is a side elevation of an automobile wheel having tire chains and provided with my chain connecter;

Fig. 2 is an elevation of the chain connecter;

Fig. 3 is a longitudinal sectional view thereof;

Fig. 4 is a section on the lines 4—4 of Figure 3.

Referring to these drawings 10 designates a tubular member open at its opposite ends and formed of metal. One end of this tubular member is formed to provide a laterally extending finger hold 11 and the opposite end of the member is preferably formed with an indentation 12 which indentation of this tube formed a boss or projection upon the inner face of the tube. A shackle 13 is engaged with the outer end of the tubular member, the shackle being preferably pivoted.

Sliding through the tubular member 10 and, therefore, having telescopic engagement with it, is a shank 14 which is cylindrical in cross section so as to fit the tube, this shank having a longitudinally extending groove 15 into which the boss 12 projects and by which the shank is prevented from turning. The outer extremity of the shank is formed to provide a laterally projecting finger hold 16 and beyond this finger hold the shank is reduced as at 17, and provided with a shackle or link 18.

The shank 14 is provided with a series of ratchet notches 19 and the tubular member 10 at one point has a hole 20 through which the tooth 21 of a pawl 22 projects. The shank of this pawl extends longitudinally along the member 10 and is riveted at one end to the member 10 as at 23. While this shank 22 might be made in the form of a leaf spring, preferably I provide a spring to urge the shank inward yieldingly holding the pawl in engagement with the notches 19. Preferably this spring is formed of spring wire coiled around a pin 24 as at 25, the wire beyond this pin at the base of the shank 22 being bent around the tube and engaged with an outwardly projecting pin 26. The wire after forming the coil 25 is extended longitudinally as at 27 along the tube 10 and then is bent laterally and curves so as to extend over the free end of the shank 22 and urge this shank toward the tube 10.

While I do not wish to be limited to the specific details which I have illustrated, preferably the finger hold 11 is formed by cutting the tube 10 away on opposite sides and turning up one end of the tube to form the member 11 and preferably the shank 14 is also tubular and is cut away in the same manner so as to provide the finger hold 16, while the extension 17 of the shank is formed by a pin or rod inserted within the tubular shank and perforated for the passage of the link 18. This device is intended to be disposed between two ends A and B of a chain and initially the two telescopic members are shifted longitudinally upon each other so as to lengthen the connecter as much as possible or necessary. Then when it is desired to draw the chain ends A and B together the members are telescoped into each other, the pawl 21 riding over the beveled faces of the ratchet notches 19 until eventually the chain ends have been drawn as tightly together as possible. The pawl 21 will, of course, then hold the telescoped members from outward movement and the chain ends taut.

This device has been particularly designed for use as a connecter for tire chains to connect the two ends of a chain on one side but I do not wish to be limited to this as it might be used in many different situations for this purpose. Neither do I wish to be limited to the use of a cylindrical member 10 and a cylindrical member 14 as these members might be rectangular in cross section.

I claim:—

1. A chain connecter of the character described comprising a tubular member open at its opposite ends and having at one end an angular finger hold, a shank having telescopic engagement with the tubular member, means for preventing the rotation of the shank within the tubular member, said shank having ratchet notches formed upon one face thereof, a spring actuated pawl mounted upon the tubular member and engaging through an opening therein with the notches, said shank being tubular and a rod inserted in said tubular shank and rigidly engaged therewith and having a shackle.

2. A chain connecter of the character described comprising a tubular member having a finger hold at one end and having an indented portion, a shank having telescopic engagement with the tubular member and having a groove into which said indentation fits, one face of the shank being formed with ratchet notches, a pawl extending through the tubular member and engaging said notches and having a shank lying along the tubular member and attached thereto, a spring operatively engaged with the tubular member and bearing upon the shank of the pawl but urging the pawl inward, and means at the opposite ends of the tubular member and shank whereby the ends of the chain may be engaged therewith.

In testimony whereof I hereunto affix my signature.

FREDERICK HELFENSTEIN, Sr.